J. BLAIR.
Bung and Bush.

No. 201,491. Patented March 19, 1878.

WITNESSES.
Geo. H. Earl
Saml. Despean

INVENTOR,
J. Blair
Per Brown Bros.
Attorneys

UNITED STATES PATENT OFFICE.

JOHN BLAIR, OF BOSTON, MASSACHUSETTS.

IMPROVEMENT IN BUNG AND BUSH.

Specification forming part of Letters Patent No. 201,491, dated March 19, 1878; application filed August 11, 1877.

*To all whom it may concern:*

Be it known that I, JOHN BLAIR, of Boston, in the county of Suffolk and State of Massachusetts, have invented an Improved Bung and Bush for Barrels, &c., of which the following is a specification:

This invention relates to an improved combination of a bung and bush for use in barrels, casks, &c., made to contain a liquid, although it is especially designed for use by brewers, &c., where the barrels or casks are filled a number of times, and where it is desirable to save the bungs.

The invention consists of a bush made of any suitable metal, adapted to be screwed into the side of a barrel or cask, in combination with a bung, also made of any suitable metal, arranged to fit in the said bush, and having ear-pieces at its inner end, by which to lock and hold the bung in its seat in the bush, the upper part of the bung being provided with an annular horizontal rim, which bears against an annular packing secured in an annular seat at the upper edge of the bush, thereby making a tight joint; and it also consists of a peculiar-shaped valve-seat, in combination with a valve, and the combination with a vent-hole in said bung of the valve and seat, all as hereinafter more fully described.

Figure 1:
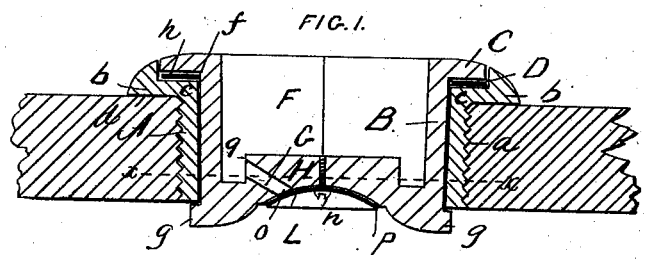
Figure 2:
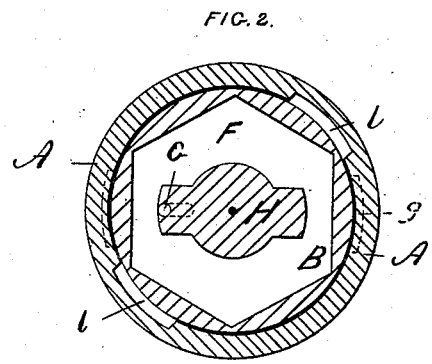
Figure 3:
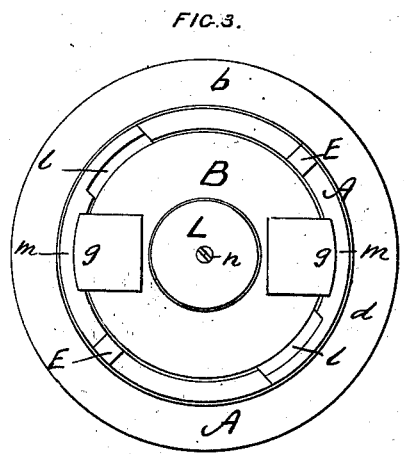
Figure 4:
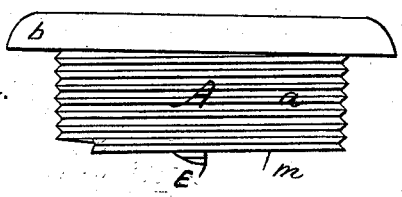

In the accompanying plate of drawings my invention is illustrated, Figure 1 being a view in vertical cross-section of a bung and bush constructed and arranged together according to this invention; Fig. 2, a cross-section on line $xx$, Fig. 1; Fig. 3, a plan view of the inner ends of the bung and bush, and Fig. 4 a side view of the bush.

In the drawings, A represents a bush, made of any suitable metal. This bush A, by an external screw-thread, $a$, is adapted to be screwed into the side of a barrel or cask, &c. A flange, $b$, on its outer end $c$, projects beyond the bush, and fits, by its shoulder $d$, against the outside of barrel when the bush is screwed into its place.

B is the bung. This bung B is made of any suitable metal, and fits loosely in the opening $f$ in bush A, and on its inner end has two projecting ear-pieces, $g\ g$, opposite to each other.

The outer end of the bung B has a flange or rim, C, which is arranged to fit in a recess, D, in the bush A when the bung is in its proper position in the bush, and also when the bung is in the bush the outer end or surface of the flange C is flush with the outer end or surface of the bush, thereby protecting the bung from injury.

A rubber washer, $h$, is placed between the flange C and its seat in the recess D, to insure tightness of the joint.

$l\ l$ are two grooves in the bush A, so arranged opposite to each other that when placing the bung in the bush the ear-pieces $g\ g$ pass through these grooves; and when the bung is thus in its seat, by turning it to the right, in the present instance, the two ear-pieces pass by their respective grooves $l\ l$, and then, projecting partially over and upon the inner edge $m$ of the bush, the said edge $m$ from each groove being on a gradual incline in the direction in which the bung is turned, the bung at its flange C is firmly forced into its seat in recess D by the binding of the ear-pieces upon the inner inclined edge $m$ of the bush, and making obviously a tight joint, insuring against leakage, said joint being the closer the farther the bung is turned, as aforesaid. To prevent, however, the bung being turned too far, stops E are placed on the edge $m$ of bush at the proper places for the ear-pieces to abut against.

F is a socket in the bung A, of sexangular shape in its sides, in which a wrench of corresponding shape externally can be put to firmer set the bung in its seat.

The inner end of bung B is hollowed or beveled out in circular form, as shown in cross-section, Fig. 1, and in this hollow or bevel $p$ is placed a flat rubber valve, L, secured at its center to the bung by a rivet, $n$, or otherwise, the said valve being of sufficient diameter to extend over and beyond, and thus cover, the inner end $o$ of a vent-hole, G, in bung A. This vent-hole G extends from the hollow seat $p$ through the end of the bung, its outlet being in the side $g$ of a raised portion, H, of the bung in the socket F, thereby by its location, as described, preventing dirt from clogging the vent-hole, and also lessening the liability of tampering or interfering with it by malicious persons.

The hollowed or beveled valve-seat enables the valve to be more sensitive and effectual in its working.

In drawing liquid from a barrel to which is applied the present invention, air from the outside can pass into the barrel through the vent-hole, the pressure raising the valve from its seat easily, and thus freely supply the necessary air to successfully and without difficulty draw the liquid from the barrel, the valve working automatically, and requiring no attention from the person drawing the liquid, and when the drawing is done the valve returns to its seat, closing the vent-hole and preventing any escape of the liquid, as well as the entrance of air to the barrel.

The valve can be made of any other material than rubber, it only requiring a material of sufficient elasticity to operate as above described. Rubber, however, will be found to be the most useful.

The bush A can be secured to the barrel in any other manner than as described, if desired.

Having thus described my invention, what I claim, and desire to secure by Letters Patent, is—

In combination with the bush A, provided with a recess, D, at its upper edge, and having grooves $l\ l$ and an inclined lower edge, the bung B, having an annular rim and packing, $h$, and provided with a vent-opening, G, and concavo-convex valve L, the whole constructed and arranged substantially as and for the purposes specified.

JOHN BLAIR.

Witnesses:
EDWIN W. BROWN,
GEO. H. EARL.